June 9, 1925. 1,541,423
R. G. LEDIG
COMBINED BICYCLE AND SCOOTER
Filed Sept. 30, 1924   2 Sheets-Sheet 2
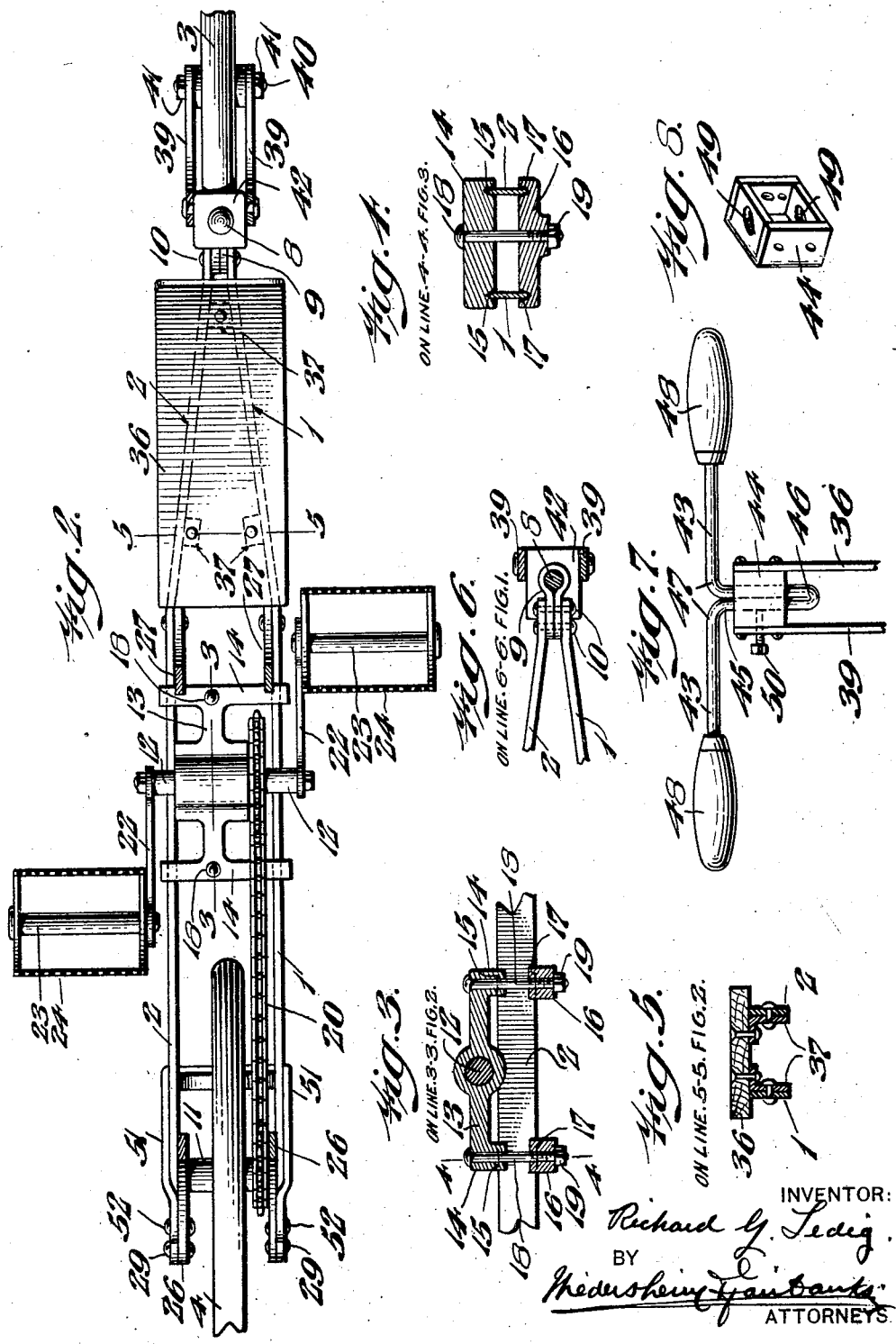
INVENTOR:
Richard G. Ledig.
BY
ATTORNEYS Patented June 9, 1925.

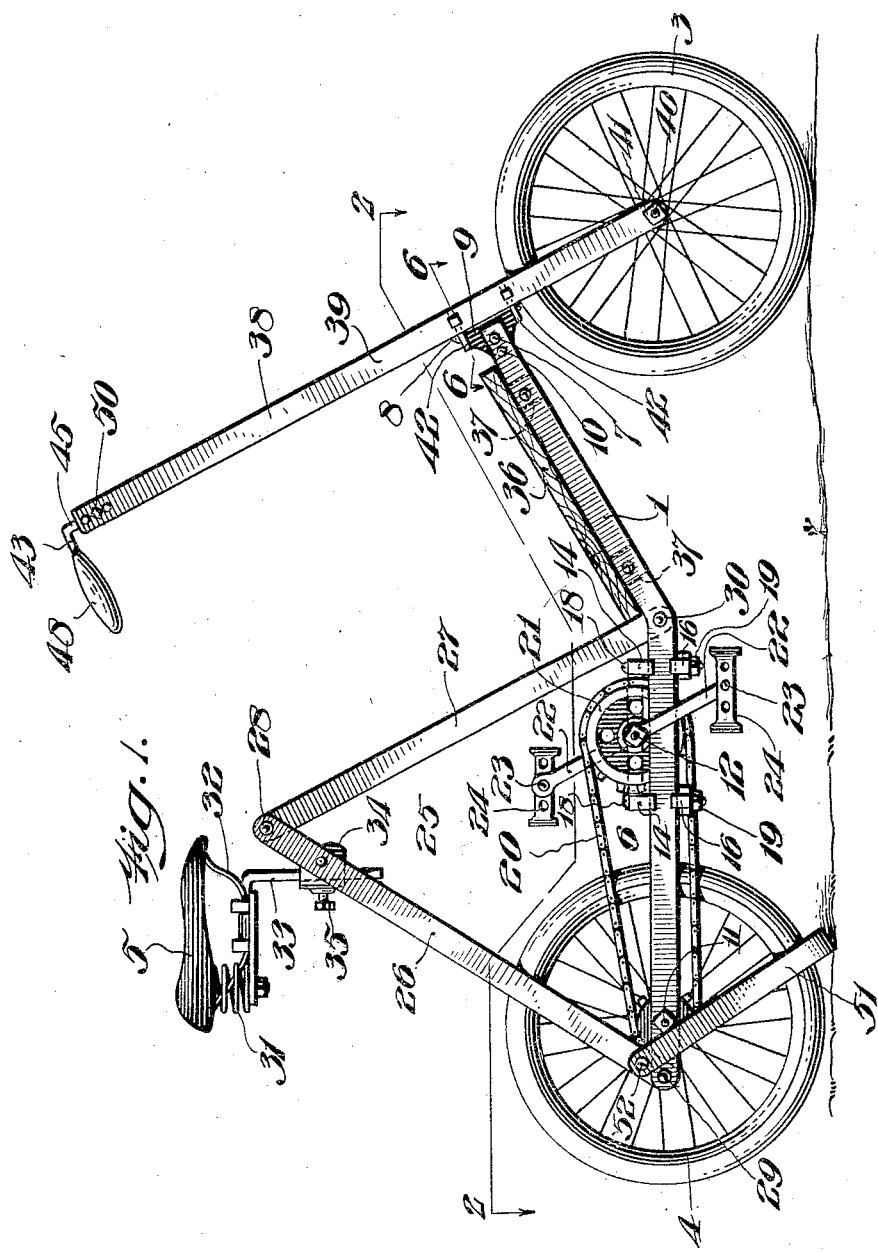

1,541,423

UNITED STATES PATENT OFFICE.

RICHARD G. LEDIG, OF PHILADELPHIA, PENNSYLVANIA, ASSIGNOR TO A. MECKY COMPANY, OF PHILADELPHIA, PENNSYLVANIA, A CORPORATION OF PENNSYLVANIA.

COMBINED BICYCLE AND SCOOTER.

Application filed September 30, 1924. Serial No. 740,719.

*To all whom it may concern:*

Be it known that I, RICHARD G. LEDIG, a citizen of the United States, residing in the city of Philadelphia, county of Philadelphia, and State of Pennsylvania, have invented a new and useful Combined Bicycle and Scooter, of which the following is a specification.

My invention relates to a novel construction of a child's bicycle, having a novel construction of frame and foot support incorporated therein, whereby the vehicle can be used as a bicycle or a scooter.

My invention further relates to such a vehicle, which may be used either as a scooter, having two wheels and a steering device, or in the usual way as a bicycle, without any change in the position of the body of the rider.

My invention further consists in a novel construction of the bicycle frame, which in the present instance is preferably formed of flat strips, which can be readily cut to the desired lengths and assembled cheaply and expeditiously, whereby a light, rigid and desirable frame is produced, upon which the bicycle elements and the scooter board are readily secured.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Fig. 1 represents a side elevation of a novel combined bicycle and scooter, embodying my invention.

Fig. 2 represents a section on line 2—2 of Fig. 1.

Fig. 3 represents a section on line 3—3 of Fig. 2.

Fig. 4 represents a section on line 4—4 of Fig. 3.

Fig. 5 represents a section on line 5—5 of Fig. 2.

Fig. 6 represents a section on line 6—6 of Fig. 1.

Fig. 7 represents a front elevation of a novel handle bar construction.

Fig. 8 represents a perspective view of a handle bar yoke.

Referring to the drawings:—

1 and 2 designate the lower or main frame members of my novel vehicle, comprising the metallic strips, preferably of steel, adapted to be mounted on the front and rear wheels 3 and 4 and to support the saddle or seat 5 and the rear wheel driving mechanism 6. The rear of the frame members 1 and 2 extends horizontally while their front ends are inclined upwardly from a point about midway of their length, and have secured to their front extremities at 7, the steering knuckle pivot 8, by means of the strap 9, whose ends are secured within or to the front converging ends of the frame members 1 and 2 by means of rivets 10 or any other suitable fastening means. The axle 11 of the rear wheel 4 is supported directly in the rear of the frame members 1 and 2, by passing the same through suitable apertures therein, the axle construction being of any well known type, either having a rigidly secured sprocket wheel or of a coaster brake type. The crank shaft 12 is supported on the frame members 1 and 2 respectively at a suitable distance in front of the rear wheel, so as to place the pedals within easy reach of the foot of the driver seated on the saddle 5. Instead of the usual expensive construction employed in bicycles made heretofore, in providing the crank housing or hanger integral with the frame, I am enabled by means of my novel flat strip frame construction, to support the crank shaft 12 on a crank shaft bearing yoke 13, resting and supported on the two frame members 1 and 2 respectively, by means of the two transverse members 14. In this novel construction, as best shown in Figs. 3 and 4, the transverse members 14, integral with and forming part of the crank shaft yoke, are positioned and held on the frame members 1 and 2, by means of the slight recesses 15, in which the edges of the frame members 1 and 2 seat, thereby preventing any lateral displacement of the crank shaft yoke with respect to the frame. The lower transverse yokes or bars 16, having similar recesses 17 for seating the edges of the frame members 1 and 2, the bolts 18 and the nuts 19, lock the crank shaft bearing yoke 13 securely to the frame members 1 and 2. By means of this novel construction, the distance between the rear wheel axle 11 and the crank shaft 12 may be readily adjusted at any time, so as to take up any slack in the driving chain 20, thereby also eliminating the set-screw adjustment of the rear wheel employed heretofore in bicycle construction. Said set-screw adjustment commonly employed in bicycles made heretofore, in addition to being expensive to construct, requires considerable skill for the proper setting thereof and is liable to throw the rear wheel out of alignment with the frame at any time, since the true alignment of the rear wheel, in such construction, depends on two independent screw threads. Thus in my novel construction, the rear wheel axle 11, and hence the rear wheel 4 is retained securely and in absolute alignment at all times with the frame of the bicycle and the steering knuckle pivot 8, of the same, due to the rigid support afforded the rear wheel axle 11 by fixed and accurate axle openings in the rear ends of the frame members 1 and 2.

The driving sprocket wheel 21, carried by the crank shaft 12, is also contained within the frame, in contradistinction to bicycle constructions employed heretofore, having the driving sprocket wheel on the outside of the frame. The crank shaft 12, as well as the crank arm 22, the cranks 23 and the pedals 24, may be of any standard construction. The crank shaft bearing yoke 13, and the lower bars 16, also act as braces between the two lower or main frame members 1 and 2 thereby making the frame rigid against any distortion.

The upper triangular seat or saddle frame 25 consists similarly of pairs of flat strips 26 and 27, secured at their lower extremities to the frame members 1 and 2, and having their upper extremities joined at 28. The lower extremities of the seat frame members 26 are secured at 29 to the rear ends of the lower or main frame members 1 and 2 respectively, by means of rivets or any other suitable fastening means, while the seat frame members 27, are joined to the lower or main frame members 1 and 2 at a point 30, approximately midway of the length of said frame members, at the point where the front ends of the frame members are turned up at a slight incline. The saddle or seat 5 of the usual type, supported on the springs 31 and 32 and having the saddle post 33, is secured to the seat frame 25, in an adjustable manner, by means of a saddle post holder 34 secured permanently to the two rear seat frame members 26, and having a vertical opening therein for receiving the saddle post 33. After positioning the saddle post 33 in the holder 34, so as to bring the saddle 5 to the desired height or distance from the pedals 24, the same is fixed in said holder by means of the set screw 35.

The scooter board 36 is carried by and secured to the converging and inclined front end portions of the lower or main frame members 1 and 2, as shown particularly in Figs. 2 and 5, by means of the angle pieces 37, riveted or otherwise secured to said frame members and to the lower face of said scooter board.

In my novel construction, the front fork and steering column are combined into one integral and continuous member 38, which is built up of two similar and parallel flat strips 39 extending between the front axle 40 and the handle bars. The front axle 40, rotatably supporting the front wheel 3 in said fork, passes through two aligned openings in the lower ends of said fork members 39, and is secured therein by means of the nuts 41 threaded onto the ends of said axle 40. The pivotal connection between the main frame members 1 and 2 and the front fork and steering column member 38, is obtained by the two hinge plates 42, secured between the two strips 39 at the proper height, by rivets or other suitable fastening means, and having two openings therein, in parallel alignment with the steering column and front fork 38. The steering knuckle pivot 8, carried by the strap 9, passes through the hinge openings in the plates 42, while the top and bottom hinge plates 42 straddle the strap 9, thereby retaining the front fork and steering column member 38 against any longitudinal displacement relative to the main frame members.

The handle bars 43, including the handle bar post 45 at a right angle thereto, is made of a single and continuous rod, as shown in Fig. 7, bent back on itself at 46, so as to form the projection or post 45, and bent at right angles at 47, so as to form the horizontal handle bars, while the handles 48 are secured to the ends of the handle bars 43 in any suitable manner. The handle bars 43 are secured to the steering column 38 by means of a handle bar yoke 44 permanently secured to and between the upper ends of the fork members 39, by means of rivets or any other suitable fastening means. The handle bar post 45 extends through two aligned openings 49 in the handle bar yoke 44, and is secured in an adjustable manner by means of the set screw 50, thus permitting a ready adjustment of the handles.

The stand 51, shown in Figs. 1 and 2, is also formed of a single continuous flat strip of metal of a U-shape, having the ends thereof pivotally secured to the saddle frame members 26 at a point 52, and resting against the extensions of the rear axle 11. When the stand 51 is not in use, it is swung up into an inclined position against the saddle frame members 26.

Among the several advantages of my novel construction, is the accessibility of the saddle or seat by either boys or girls, since the structure does not have any front triangular frame member, such as is common in ordinary bicycles, or even the two superimposed parallel frame members, as is common practice in the construction of girls' bicycles. By this novel construction I obtain the necessary clearance for the feet of the rider, without the straddling of any frame members, thus permitting the rider to alight or dismount from the saddle with perfect freedom.

The scooter board mounted on the main frame, in front of the crank shaft and pedals, and at about the height of the pedals so as to be within easy reach of the feet of the rider, produces a novel and very desirable combination of bicycle and a scooter or what may be called a power scooter.

By my novel construction, moreover, I produce a power scooter which may be mounted with great freedom and ease by either boys or girls, may be used to coast, either seated on the saddle or in standing position, and may be used as a foot driven bicycle.

Having thus described my invention what I claim as new and desire to secure by Letters Patent, is:—

1. In a device of the character described, a lower frame comprising two coextensive frame members, having their rear portions spaced apart and substantially parallel to each other so as to form a rear fork, a rear wheel rotatably mounted in said fork near the rear extremities of said lower frame members, a crank shaft yoke straddling said two lower frame members and provided with transverse end bars secured thereto, and a crank shaft operatively connected with the rear wheel carried by said crank shaft yoke.

2. In a device of the character described, a crank shaft yoke, having a crank shaft bearing, and transverse end bars integral therewith, frame members and seats in said yoke bars near the ends thereof, for the reception of said frame members.

3. In a device of the character described, a crank shaft yoke, having a crank shaft bearing, and transverse end bars integral therewith, frame members and seats in said yoke bars near the ends thereof, for the reception of said frame members, in combination with opposed lower transverse bars, also having seats therein, and fastening devices common to said yoke and bars.

4. In a bicycle, a lower frame work extending substantially the length of the bicycle, a rear axle fixedly carried by the rear end of said frame, a crank shaft carried by said frame in advance of said rear axle and adjustable longitudinally of said frame, a crank shaft yoke having transverse end bars secured to said frame, sprocket wheels carried by said rear axle and crank shaft respectively, and a sprocket chain operatively connecting said sprocket wheels.

RICHARD G. LEDIG.

Witnesses:
E. HAYWARD FAIRBANK,
N. BUSSINGER.